US007139696B2

(12) United States Patent
Tokieda et al.

(10) Patent No.: US 7,139,696 B2
(45) Date of Patent: Nov. 21, 2006

(54) METHOD FOR PERFORMING MULTILINGUAL TRANSLATION THROUGH A COMMUNICATION NETWORK AND A COMMUNICATION SYSTEM AND INFORMATION RECORDING MEDIUM FOR THE SAME METHOD

(75) Inventors: Hidemasa Tokieda, Zama (JP); Tadao Mikami, Chiba (JP); Koji Mori, Tokyo (JP)

(73) Assignee: IIS Inc., Tokyo (JP)

( * ) Notice: Subject to any disclaimer, the term of this patent is extended or adjusted under 35 U.S.C. 154(b) by 819 days.

(21) Appl. No.: 10/070,359

(22) PCT Filed: Jul. 4, 2001

(86) PCT No.: PCT/JP01/05802

§ 371 (c)(1),
(2), (4) Date: Mar. 5, 2002

(87) PCT Pub. No.: WO02/03241

PCT Pub. Date: Jan. 10, 2002

(65) Prior Publication Data

US 2002/0152063 A1    Oct. 17, 2002

(30) Foreign Application Priority Data

Jul. 5, 2000     (JP)     ............................. 2000-203273

(51) Int. Cl.
G06F 17/20 (2006.01)
G06F 17/27 (2006.01)
G06F 17/28 (2006.01)
(52) U.S. Cl. ..................... 704/8; 704/9; 704/4; 704/5
(58) Field of Classification Search .................. 704/1, 704/2, 3, 5, 7, 8, 9, 4; 709/203
See application file for complete search history.

(56) References Cited

U.S. PATENT DOCUMENTS 5,497,319 A * 3/1996 Chong et al. .................. 704/2

(Continued)

FOREIGN PATENT DOCUMENTS

EP    0 413 556    * 8/1990

(Continued)

*Primary Examiner*—Richemond Dorvil
*Assistant Examiner*—Thomas E. Shortledge
(74) *Attorney, Agent, or Firm*—Manabu Kanesaka

(57) ABSTRACT

The invention realizes a quick and inexpensive translation service in many languages by means of a single Web site (firmware) on a communication network.

In order to perform a quick translation in many languages requested through a communication network, the invention has been composed so that a multilingual translation Web site apparatus 2 functioning as a Web site (firmware) consisting of one apparatus and one translation processing system receives language data of a subject of translation from a translation requester apparatus 4.

The multilingual translation Web site apparatus 2 changes its processing form adaptively to the language of the subject of translation received, and automatically selects language data for translation. A translator apparatus 3 performs translation of the language data received from the multilingual translation Web site apparatus 2. The multilingual translation Web site apparatus 2 receives and enters the translated data from the translator apparatus 3 into the multilingual processing database, and automatically changes its processing form of translation adaptively to the language after translation, and enables the translation requester apparatus 4 to receive the translated data.

19 Claims, 15 Drawing Sheets

U.S. PATENT DOCUMENTS 5,535,120 A * 7/1996 Chong et al. .................. 704/3
5,841,764 A * 11/1998 Roderique et al. .......... 370/310
5,987,402 A * 11/1999 Murata et al. ................. 704/2
6,623,529 B1 * 9/2003 Lakritz ....................... 715/536

FOREIGN PATENT DOCUMENTS

| | | | |
|---|---|---|---|
| JP | 62-163177 | * | 7/1987 |
| JP | 7-36909 | | 2/1995 |
| JP | 7-192000 | | 7/1995 |
| JP | 8-305704 | | 11/1996 |
| JP | 09-065424 | * | 3/1997 |
| JP | 10-269285 | | 10/1998 |
| JP | 10-283356 | | 10/1998 |

* cited by examiner

```
<html>
<head>
   <title><MLWSTEXT ID=123001 MAXLEN=30> Test page </MLWSTEXT></title>
</head>
<body>
<MLWSTEXT ID=123002 MAXLEN=120 HEIGHT=5 WIDTH=30>This is a test page
</MLWSTEXT>
                              Test
<img alt="MLWSTEXTID=123003:photograph src="img009.gif">
</body>
</html>
```

(a)

| Field name | Record | . . . | Record | . . . . . . |
|---|---|---|---|---|
| Text ID | 123001 | | 123003 | |
| Language ID | JP | | JP | |
| Maximum number of characters | 30 | | 0 | |
| Number of characters | 6 | | 5 | |
| Character string | Test page | | Test photograph | |
| Translator ID | 568 | | 568 | |

(b)

| Field name | Record | . . . | Record | . . . . . . |
|---|---|---|---|---|
| Text ID | 123001 | | 123003 | |
| Language ID | US | | US | |
| Maximum number of characters | 30 | | 0 | |
| Number of characters | 9 | | 15 | |
| Character string | Test page | | Test photograph | |
| Translator ID | 326 | | 326 | |

FIG. 10

| Japanese | English | German | ------- | Chinese |
|---|---|---|---|---|
| 1 | 0.8 | 0.8 | ------- | 1.1 |

| Japanese | English | German | ------- | Chinese |
|---|---|---|---|---|
| 1 | 1.3 | 1.3 | ------- | 0.8 |

METHOD FOR PERFORMING MULTILINGUAL TRANSLATION THROUGH A COMMUNICATION NETWORK AND A COMMUNICATION SYSTEM AND INFORMATION RECORDING MEDIUM FOR THE SAME METHOD

TECHNICAL FIELD

The present invention relates to a method for performing multilingual translation through a communication network, performing and providing a translation in many languages requested by utilizing a communication network, and a communication system and information recording medium for the same method.

BACKGROUND ART

Up to now, an example of utilizing a communication network (Internet for example) under a TCP/IP (Transmission Control Protocol/Internet Protocol) environment is known as a multilingual translation service of this kind.

FIG. 18 is a block diagram for explaining the architecture of a conventional Web (Web: World Wide Web) site for performing a multilingual translation, and FIG. 19 is a flowchart showing a procedure for performing the multilingual translation by the Web site of FIG. 18. And FIG. 20 is a flowchart showing a procedure for maintenance of the multilingual translation by the Web site of FIG. 18.

In this example, as shown in FIG. 18, a Web site connected to a TCP/IP transmission circuit network has been built for each of Japanese, English, German, French, and so forth in many languages. A Web server processes the respective languages (ranging from Japanese to French and so forth) in the respective Web sites. Such a Web site is a processing system of hardware having software installed in it, namely, an individual firmware.

This architecture is a structure in which a UNIX workstation or the like to be a Web site is connected to such a digital circuit network as ISDN or the like, and a general-purpose small computer to be used by a translator is connected and further a general-purpose small computer, a UNIX workstation or the like to be used by a translation requester is connected to the digital circuit network.

In this communication network structure, a so-called two-way communication through the Internet communication is performed by a Web browser (application).

In such a multilingual translation service, in a process of multilingual translation of FIG. 19, a master site is downloaded and copied through a TCP/IP transmission circuit network (step S1), and data of HTML (Hyper Text Markup Language) of its language portion are extracted and converted into language data (step S2). Next, the language data is translated into a destination language (step S3). After this, the translated language is converted into HTML data (step S4). Further, the language HTML data are ported into a copy site and adjusted (step S5). These processes are repeated for necessary languages.

And in a maintenance process of FIG. 20, a Web administrator is notified of change of a master site (step S11), and a language portion needing to be translated is selected (step S12). HTML data of the language portion are extracted and converted into language data (step S13). Next, the language data are translated (step S14) and these translated language data are converted into HTML data (step S15). Next, the language HTML data are ported into a Web site and adjusted (step S16). These steps on and after the step of extracting and converting HTML data of the language portion into language data are repeated for necessary languages. In this way, a multilingual translation service utilizing the Internet is provided.

DISCLOSURE OF THE INVENTION

In such a conventional example as described above, a Web site for each language in many languages using the Internet is built and each Web server processes a language. Therefore, it has a disadvantage that it is enlarged in processing scale and apparatus scale.

The present invention attempts to solve such a problem of the prior art, and an object of the present invention is to provide a method for performing multilingual translation through a communication network, said method making it possible to perform translation in many languages by means of a single Web site on a communication network and suppress its enlargement in processing scale and apparatus scale, and a communication system and information recording medium for the same method.

In order to attain the above object, a method for performing multilingual translation through a communication network according to the present invention, performing and providing translation in many languages requested, said method comprising a step of receiving language data of a subject of translation, a step of changing its processing form adaptively to the language of a subject of translation requested, a step of automatically selecting language data for translation, a step of performing translation, a step of entering the translated data into a multilingual processing database, a step of automatically changing the processing form of translation adaptively to a language after translation, and a step of enabling a requester side to receive the translated data.

A method of the present invention is characterized by performing multilingual translation through a single Web site consisting of one apparatus and one translation processing system.

And a method of the present invention is characterized in that said step of automatically selecting language data for translation generates language data and image data being non-language data in master contents by means of a template. Further, a method of the present invention is characterized by converting language data contained in said image data from a text form into a binary form and replacing the text-form data with the binary-form data.

And a method of the present invention is characterized in that said step of performing translation is an automatic machine translation and/or a manual input translation.

Further, a method of the present invention is characterized by giving a page record and a text record as contents information for processing each page in said multilingual processing database.

And a method of the present invention is characterized in that said page record comprises;

a page ID (page identification): a symbol number being unique to each page, a language ID: a symbol number defined for each language, a page address: URL of a home page, a date of generation: a date at which the page was generated, a generator ID: a symbol number of a person who newly generated the page, a date of update: a date at which the page was updated last, an updater ID: a symbol number of a person who updated it last, a customer ID: a symbol number assigned to each customer, and a received order ID: a symbol number determined on reception of an order, HTML: a page source text in the form of HTML.

Further, a method of the present invention is characterized in that said text record comprises;

a text ID (text identification): a symbol number which is unique to each text and is the same in any language, a language ID: a symbol number defined for each language, the maximum number of characters: the maximum number of characters capable of being displayed, the number of characters: the number of characters actually displayed, a character string: a character string in itself, and a translator ID: a symbol number determined for each translator.

And a method of the present invention is characterized by determining in advance the ratio of the number of the smallest legible font characters to the number of characters being displayed on the screen for each language, and associating the maximum number of characters of a text data record with a symbol number defined for each language by means of this ratio.

Further, a method of the present invention is characterized by obtaining the number of characters in a language after translation on the basis of a table storing in advance the ratio of change in number of characters in a language before translation and in a language after translation.

And a method of the present invention is characterized by setting a storage area adaptively to said maximum number of characters, judging whether or not characters of a language after translation can be accommodated in the storage area of the maximum number of characters in comparison with the number of characters of the language before translation through computing the number of characters after translation and, in case that the maximum number of characters after translation can be accommodated in the storage area, performing the translation, and in case that the maximum number of characters cannot be accommodated in the storage area, reducing the number of characters of the language before translation so as not to change the meaning.

Further, a method of the present invention is characterized in that said Web site consisting of one apparatus and one translation processing system performs a multilingual translation process and its maintenance process and as the multilingual translation process, generates master contents by means of a template, next translates language data of the master contents, repeats these generation and translation processes, stores the language data together with control information into a multilingual processing database, further converts the language data into HTML data and writes them into the master contents on request, and as the maintenance process, monitors change of the master contents, automatically selects a language data file needing to be translated, translates the language data, repeats these monitor, automatic selection and translation processes for necessary languages, and reenters the translated language data into the multilingual processing database.

And a method of the present invention is characterized by exchanging data with a database management database (i.e., a database that stores the page/text records) and a contents language database (i.e., a database that stores the dictionary and grammar rules necessary to effect a translation) through said database access management process (i.e., the interchange of information between the aforementioned database management database and the contents language database), performing requests including reference, addition, update and deletion with respect to a multilingual processing database and the outside, and obtaining the respective results of these requests through said database access management process.

A multilingual translation communication system of the present invention is a multilingual translation communication system performing and providing translation in many languages requested through a communication network, said system comprising a multilingual translation Web site apparatus for functioning as a Web site composed of one apparatus and one translation processing system connected to a communication network and performing a multilingual translation, a plurality of translator apparatuses for performing translation in many languages, and a plurality of translation requester apparatuses for requesting the multilingual translation Web site apparatus side of translation, wherein said multilingual translation Web site apparatus receives language data of a subject of translation from a translation requester apparatus, changes its processing form adaptively to the language of the subject of translation which the multilingual translation Web site apparatus has received, and automatically selects language data for translation, and wherein said translator apparatus performs translation of language data received from said multilingual translation Web site apparatus, and said multilingual translation Web site apparatus receives translated data from said translator apparatus and enters them into a multilingual translation processing database and automatically changes its translation processing form adaptively to the language after translation, and said translation requester apparatus receives the translated data.

A system of the present invention is characterized in that said multilingual translation Web site apparatus is provided with a Web server, and this Web server is provided with a master Web site portion for processing master contents composed of language data and/or non-language data and a multilingual processing database.

And a system of the present invention is characterized in that a net-bank apparatus which makes it possible to perform settlement of a transmission fee between said multilingual translation Web site apparatus side and a translator apparatus side and/or between the multilingual translation Web site apparatus side for performing translation and a translation requester apparatus side is further connected to the communication network.

Further, a system of the present invention is characterized in that said communication network is a public wire communication network or a public radio communication network or a non-public wire communication network or a non-public radio communication network under a TCP/IP environment.

And a system of the present invention is characterized in that at least one of said multilingual translation Web site apparatus, said translator apparatus and said translation requester apparatus is provided with a radio communication means for performing a radio-channel connection to a radio communication network under a TCP/IP environment.

An information recording medium of the present invention is characterized by storing in it a program for enabling a substantial computer to control a process of receiving language data of a subject of translation through a communication network, a process of changing its processing form adaptively to the language of a subject of translation requested, a process of automatically selecting language data for translation, a process of performing a translation transferred through the communication network, a process of entering the translated data into a multilingual processing database, a process of automatically changing its translation processing form adaptively to the language after translation, and a process of enabling a requester side to receive the translated data through the communication network.

An information recording medium of the present invention is characterized by further storing in it a program for enabling a substantial computer to control at least one of a process of generating language data and image data being non-language data by means of a template, a process of converting language data contained in image data from a text form into a binary form and replacing the text-form data with the binary-form data, a process of giving a page record and a text record as contents information for processing each page in a multilingual processing database, and a process of judging whether or not characters to be obtained after translation can be accommodated in a storage area of the maximum number of characters through computing the number of characters after translation relative to the number of characters of a language before translation.

Such a method for performing multilingual translation through a communication network and a communication system and information recording medium for the same method make it possible to perform a translation service in many languages by means of a single Web site (single Web site/firmware) consisting of one apparatus and one translation processing system on a communication network and suppress its enlargement in processing scale and apparatus scale.

BRIEF DESCRIPTION OF THE DRAWINGS

FIG. 10 is a figure for explaining concrete contents in a text record conversion in the embodiment, in which: (*a*) is a Japanese (JP) text record and (*b*) is an English (US) text record obtained by translation.

BEST MODE FOR CARRYING OUT THE INVENTION

Next, a method for performing multilingual translation through a communication network and a communication system and information recording medium for the same method are described in detail with reference to the drawings.

Figure 1:
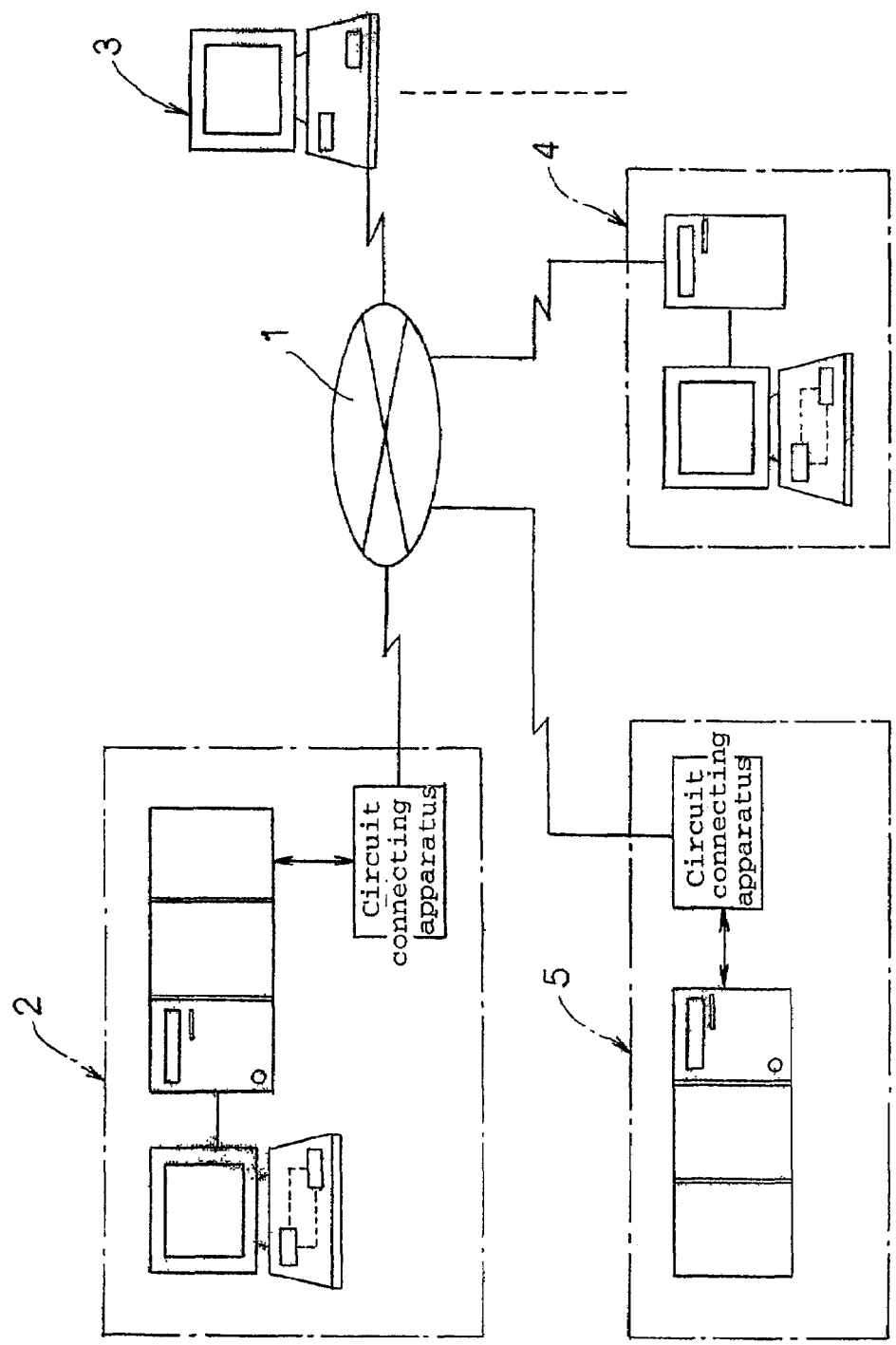
FIG. 1 is a block diagram showing the structure of an embodiment of the present invention.

FIG. 1 is a block diagram showing the structure of an embodiment of the present invention.

In FIG. 1, this example shows a composition example of the Internet under a TCP/IP environment.

In this example, a multilingual translation Web site apparatus (platform/Web site) 2 for providing a multilingual translation service through the Internet and a plurality of translator apparatuses 3 for performing translation in many languages are connected to a digital signal communication network 1 such as ISDN (Integrated Services Digital Network) or the like. Further, a plurality of translation requester apparatuses 4 for requesting a multilingual translation Web site 2 side of translation through the Internet and a net-bank apparatus 5 for performing a net settlement (electronic commercial transaction) of a translation fee are connected to the digital wire communication network 1.

Translation fees to be settled by a net settlement include a translation fee in case that the translation requester apparatus 4 side requests the multilingual translation Web site apparatus 2 side of translation and a translation fee in case that the multilingual translation Web site apparatus 2 side requests a translator apparatus 3 side of translation.

The digital wire communication network 1 is well known in composition and transmission method as ISDN, and is of a network configuration in which a digital exchange (PBX) is installed in a transmission circuit network.

This example uses a UNIX workstation as the multilingual translation Web site apparatus 2 in FIG. 1 and uses a general-purpose small computer used by an individual translator as the translator apparatus 3. In a translation company and the like, for example, a UNIX workstation system is used.

And this example uses a UNIX workstation system as a net-bank apparatus 5 in FIG. 1 and further uses here a general-purpose small computer personally used as the translation requester apparatus 4. In case that a translation requester is a company or the like, for example, a UNIX workstation system is used.

And this example uses a UNIX workstation as the net-bank apparatus 5 in FIG. 1, and further uses a general-purpose small computer to be used by an individual person as the translation requester apparatus 4. In case that a translation requester is a company or the like, for example a UNIX workstation system is used.

Hardware of a general-purpose small computer to be used as the translator apparatus 3 and the translation requester apparatus 4 is of a publicly known composition. That is to say, it is provided with an interface (I/F) circuit to be connected to a circuit connecting device (digital terminating device DSU, terminal adaptor TA and the like) as well as a microprocessor (MPU) composed of a CPU, a ROM, a working RAM and the like. And this general-purpose small computer is provided with a reader/writer device for installing a communication protocol and a program for "performing multilingual translation of the present invention" described in detail in the following and for reading/writing process data through an information recording medium (floppy disk (FD), CD-ROM, detachable memory MS). Further, this general-purpose small computer is provided with a monitor device such as a color liquid crystal display (LCD) device and an input device consisting of a keyboard and a coordinates input device (mouse, input pad and the like), and is further provided with an input/output (I/O) circuit for performing a data input/output process to the respective portions. And this general-purpose small computer is provided with a memory for storing process data in it and particularly a multilingual processing database using a hard disk device performing a file process for "performing multilingual translation of the present invention", and is provided with an I/F circuit for performing drive-connection with a printer and the like.

The UNIX workstations of the multilingual translation Web site apparatus 2 and the net-bank apparatus 5 in FIG. 1 are publicly known in hardware composition.

This UNIX workstation system is provided with a circuit connecting device comprising a DSU, a router and the like, a Web server being a main computer for performing a basic communication process and a database. And this UNIX workstation system is generally provided with also an edition server for reediting such distributed data as graphics, characters and the like adaptively to application (for example, an i-mode mobile telephone).

And such a UNIX workstation is provided with an interface circuit for installing a firewall application into a Web server and connecting an electronic mail/image (FAX) server or a general-purpose small computer. Further, a configuration in which such a UNIX workstation is provided with a LAN server for performing a sequence in this apparatus, an FTP server for performing an FTP (File Transfer Protocol) file transfer, an interworking function (IWF) server for processing connection on the Internet or the like and a Web server dedicated to executing a firewall application for prevention of invasion, and the like is publicly known. In addition to these configurations, the UNIX workstation is provided with a reader/writer device for installing a communication protocol and a program for "performing multilingual translation of the present invention" through an information recording medium and reading/writing process data, and a multilingual processing database performing various kinds of file processes (data storage and retrieval/multilingual processing database engine using a relational system or network system) for "performing multilingual translation of the present invention". And in addition to this configuration, the net-bank apparatus 5 is generally provided with a DNS server used for a distributed name management system (DNS: Domain Name System) and an SSL server for performing an encryption communication protocol (SSL: Secure Sockets Layer) used in an encryption transmission for various kinds of security protection.

Such a Web server under a TCP/IP environment is implemented as a multifunctional apparatus by using a computer and having a communication protocol and a program installed in it. And the Web server has the same composition as a general-purpose small computer, and may be changed in architecture adaptively to said "performance of multilingual translation of the present invention".

In this case it is enough to make its composition in consideration of traffic volume in processing a communication protocol and in consideration of the quantity of process data in data processing. For example, such a system may be composed in consideration of a duplexed CPU configuration, disposition of a plurality of multilingual processing databases, use of a mass storage and the like.

Figure 2:
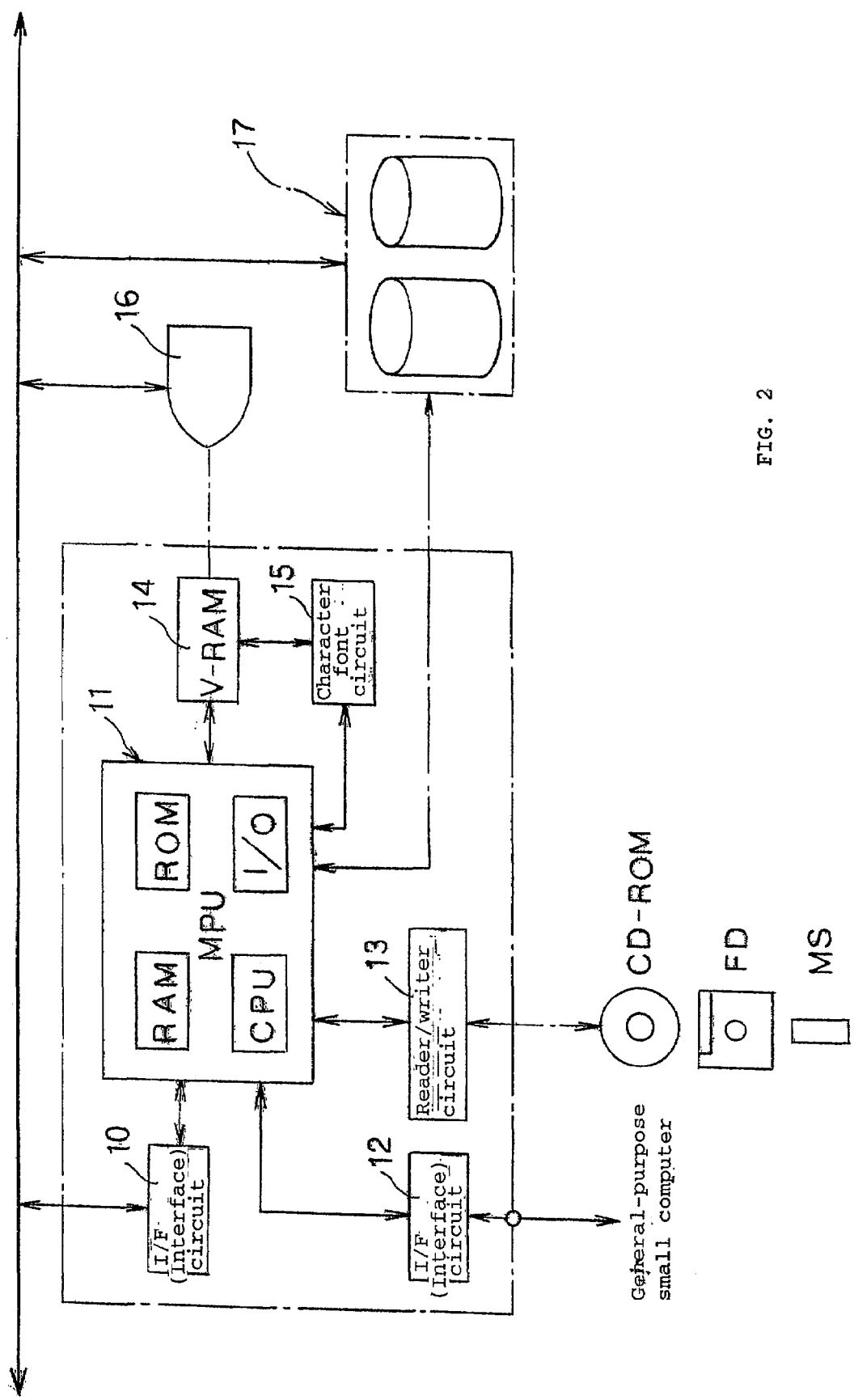
FIG. 2 is a block diagram showing an example of a Web server for carrying out the present invention.

FIG. 2 is a block diagram showing a composition example of a main part of a Web server for carrying out the present invention.

This example is provided with an I/F circuit 10 which is connected to a bus of a UNIX workstation and performs an interface process with another apparatus not illustrated. And this example is provided with a microprocessor (MPU) 11 to be connected to the I/F circuit 10 and a bus. The microprocessor 11 is composed of a working RAM, a RAM having a boot control program stored in it, an input/output (I/O) circuit, a CPU and the like. The microprocessor 11 is provided with an I/F circuit 12 for connecting with a general-purpose small computer and a reader/writer device 13.

The reader/writer device 13 installs a communication protocol and a program for "performing multilingual translation of the present invention" through an information recording medium (floppy disk (FD), CD-ROM or detachable memory MS) and reads/writes process data.

And the microprocessor 11 is provided with a video RAM (V-RAM) 14 and a character font conversion circuit 15 for converting/generating the size of characters displayed for each language in many languages. This character font conversion circuit 15 is composed of a RAM and the like comprising a conversion table for converting each language character at a ratio of the smallest font. Conversion/generation of the size of displayed characters of each language is explained in the following (see FIG. 12).

Output of the V-RAM 14 is transferred to a monitor device 16 connected to a bus of a multidrop mode. And the microprocessor 11 performs data processing for "performing multilingual translation of the present invention" with a multilingual processing database apparatus 17 connected to the bus.

The multilingual processing database apparatus 17 can be also distributively disposed at a remote place, as described with reference to the following FIG. 11.

Next, the process and operation of this embodiment are described.

First, an application (communication protocol and program) for communication operation of each device in FIG. 1 is explained.

Each apparatus shown in FIG. 1 performs a communication connecting process by means of TCP/IP publicly known as an Internet communication, a language processing function (writing and speech processing, JPEG static image processing or MPEG dynamic image processing by means of data compression) by a language such as HTML (Hyper Text Markup Language), XML (eXtensible Markup Language) and the like, transfer by means of a hyperlink function, a two-way communication by means of HTTP (Hypertext Transfer Protocol), file transfer by FTP, and an external application by means of CGI (Common Gateway Interface). Each apparatus is equipped with a Web browser (application) for performing an electronic mail communication and Internet surfing for this purpose.

In FIG. 1, each apparatus performs a file transfer by publicly known IP packets in two-way communication through a TCP/IP link. Such a transfer process on the Internet is performed by an object pointing operation in HTTP (object pointing to a radio button, anchor, push button or the like by a coordinates input device such as a mouse or the like: commonly called "click"). In this case, an end description character (FIN) of opening of a TCP connection, an acknowledgement character (ACK) and the like are stored in a file format, and a file transfer is performed through identification of them, but description of them is omitted in the following description.

Next, the digital wire communication circuit network 1 shown in FIG. 1 is described in transmission form.

The digital wire communication circuit network 1 shown in FIG. 1 transmits IP packets at transmission rates of 64 kbits/sec, 384 kbits/sec and 1.5 Mbits/sec, for example. At a transmission rate of 64 kbits/sec, it performs a "2B+D (information channels of 32 kbps×2+control channel of 16 kbps)" transmission through a packet switching procedure X.31 (I.430/I.431, Q.921/Q.931, X.25 Protocol) by ITU-T Recommendations. It is acceptable also to apply another high-speed transmission method (asymmetric digital transmission, for example) and to apply a high-speed communication method (gigabit high-speed data communication method, for example).

And since a general-purpose small computer for the translator apparatus 3 and the translation requester apparatus 4 shown ing FIG. 1 performs a well-known operation, description of it is omitted.

Further, a UNIX workstation for the multilingual translation Web site apparatus 2 and the net-bank apparatus 5 in FIG. 1 performs a sequence for "performing multilingual translation of the present invention" through a Web server, a LAN server and the like. For example, it performs its electronic mail communication or Internet surfing through performing the respective sequences of a CSMA/CD random access method similar to an Ethernet LAN or the like and an RPC (Remote Procedure Call) remote call.

The general-purpose small computer or UNIX workstation performs "performance of multilingual translation of the present invention" by means of a communication protocol and a program executed by a CPU (including also a CPU of the Web server). These communication protocol and program are installed into each apparatus together with said general-purpose communication protocol and program in combination with a communication protocol and program specialized in "performing multilingual translation of the present invention".

This "performance of multilingual translation of the present invention" is provided as an information recording medium (FD, CD-ROM or detachable memory for example) having its program stored in it. In other words, it is offered as a general-purpose package capable of being on the market.

Next, "performance of multilingual translation of the present invention" based on the operation of each apparatus is described.

First, an outline of "performance of multilingual translation of the present invention" is described.

Figure 3:
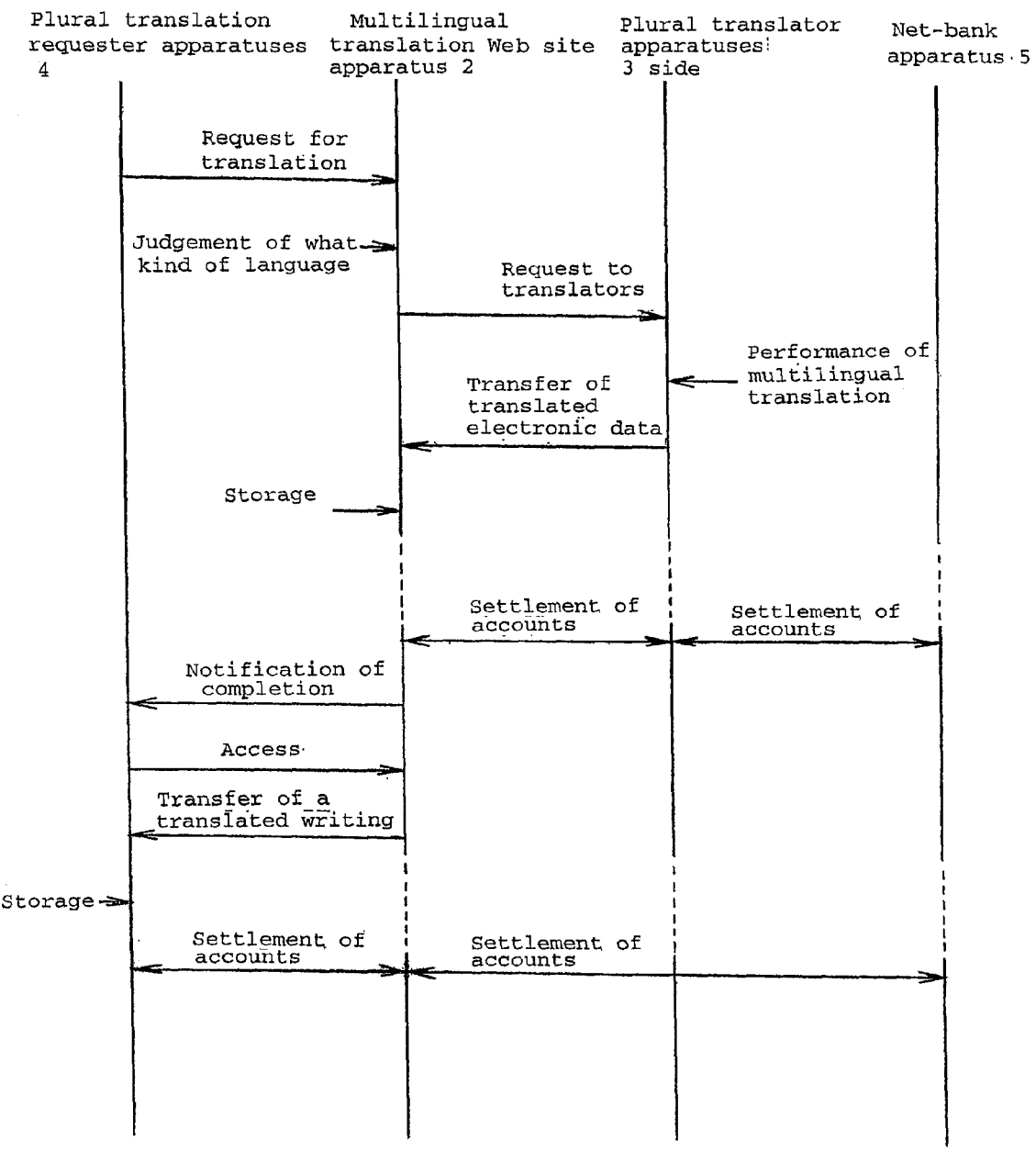
FIG. 3 is a sequence diagram showing an outline of performance of multilingual translation of the present invention.

FIG. 3 is a rough sequence diagram of "performance of multilingual translation of the present invention".

Referring to FIG. 3, the multilingual translation Web site apparatus 2 takes in a translation request from a translation requester apparatus 4 through an electronic mail or a Web site (home page/HTTP) opened to the public by the multilingual translation Web site apparatus 2 through the digital wire communication circuit network 1. The language of received information is one of many kinds of languages (Japanese, for example).

Therefore, a general-purpose Web browser which the multilingual translation Web site apparatus 2 is provided with cannot read such a language on occasion. Therefore, a Web browser of an application capable of reading many languages is installed. For example, an application for performing judgement by tracking a language possible to be transferred is installed in advance. This tracking is to compare a part of a transferred character string with character strings of many languages stored in advance. And like "cookie", its language is judged by identifying that it is a former visitor to the home page. It is acceptable to identify a navigation language or navigation browser language returned by the installed Web browser.

Next, the multilingual translation Web site apparatus 2 transfers a manuscript for translation requested together with the time limit of delivery and special notes to a translator apparatus 3 side capable of performing translation between languages specified by the translation request. This is performed through a "multilingual translation network" in which translators performing translation in many languages are organized on the Internet.

Next, the translator apparatus 3 side performs translation between the specified languages. In this case, a translator installs a translation software into a general-purpose small computer of the translator apparatus 3 and performs its machine translation, or performs a manual input translation by means of a word processor software and makes a translation writing by its electronic data and transfers it together with a bill to the multilingual translation Web site apparatus 2.

In case that a translator apparatus 3 performs an ;automatic machine translation, the translator apparatus 3 performs a translation application of the multilingual translation Web site apparatus 2 through CGI or installs a translation application in it and performs the translation application in a stand-alone state. And the multilingual translation Web site apparatus 2 side may perform an automatic machine translation and then transfer its translation writing to a translator apparatus 3, and may have a translator brush up the translation including examination.

The multilingual translation Web site apparatus 2 stores the transferred translation writing electronic data into a multilingual processing database (the multilingual processing database apparatus 17 in FIG. 2). After this, an electronic transaction settlement (transfer of fund) to this translator (translator apparatus 3) using a debit card or the like is performed between the net-bank apparatus 5 and the multilingual translation Web site apparatus 2 to pay a translation fee to the translator (translator apparatus 3).

After this, the multilingual translation Web site apparatus 2 notifies the translation requester apparatus 4 side of the completed translation writing together with a bill through an HTTP link with an electronic mail or the Web site (home page). After this notification, the translation requester apparatus 4 side inputs an identification code ID and a password specified at the time of notification into the multilingual translation Web site apparatus 2, and receives and stores the completed translation electronic data into the multilingual processing database.

Further, after this the multilingual translation Web site apparatus 2 performs an electronic transaction settlement (transfer of fund) using a debit card or the like through the translation requester apparatus 4 and the net-bank apparatus 5 to receive a translation fee from the translation requester apparatus 4 side.

In these processes, by giving an identification code ID described later, the kinds of languages, the number of displayed characters of a writing, a translator, the time limit of delivery and the like are managed and dealt with. And a settlement of accounts between the multilingual translation Web site apparatus 2 side and the translation requester apparatus 4 side, and a settlement of accounts between the multilingual translation Web site apparatus 2 side and the translator apparatus 3 side may utilize various methods of payment (bank transfer of fund, check payment and the like) using no net-bank apparatus 5 in particular.

In such a way, it is possible to perform multilingual translation by means of one Web site (a single Web site) consisting of one apparatus and one translation processing system, and to suppress the enlargement of its processing scale and apparatus scale.

Figure 4:
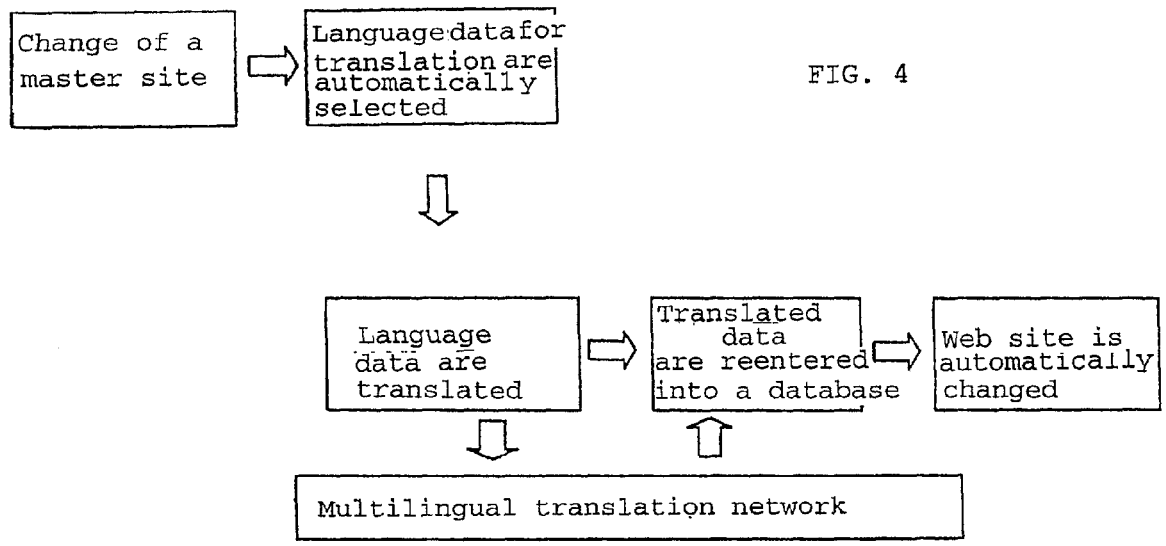
FIG. 4 is a diagram for explaining a work process in a multilingual translation Web site in FIG. 1.
Figure 5:
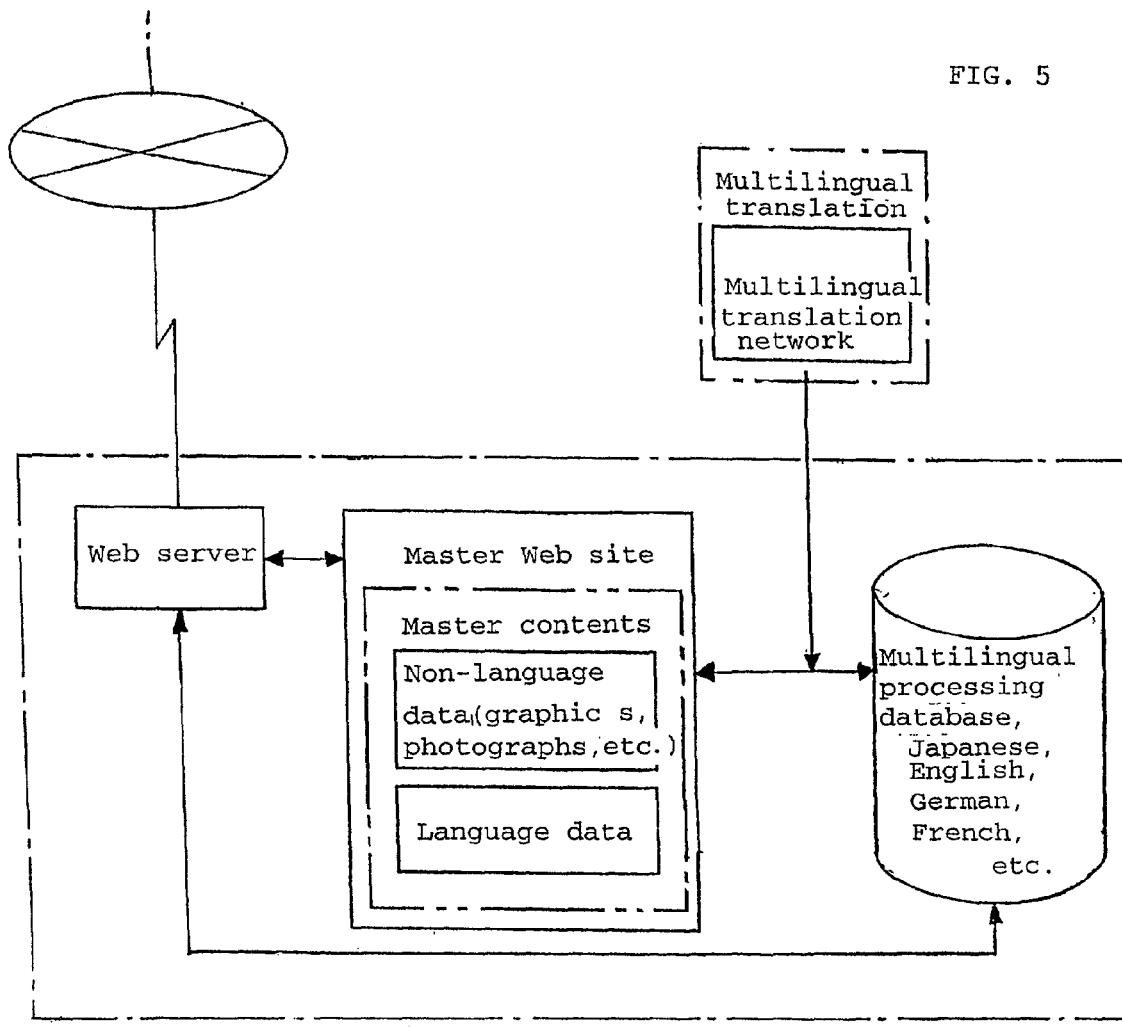
FIG. 5 is a block diagram for explaining a functional composition for performing the work process of FIG. 4.

FIG. 4 is a diagram for explaining a translation process (working) in the multilingual translation Web site apparatus 2, and FIG. 5 is a block diagram for explaining a functional composition for performing the translation process of FIG. 4. A process of translation is substantially in the following procedure: 1) a step of changing a master Web site (refer to detailed description with reference to the following FIG. 12) on the basis of a language translation in many languages, 2) a step of automatically selecting language data for translation excepting non-language data (image data of graphics and pictures) from master contents of the master Web site, 3) a step of translating the language data, said translation being performed through a "multilingual translation network" in which translators performing translation in many languages are organized on the Internet, wherein this translation may be either an automatic machine translation as describe above or a manual input translation, 4) a step of entering again the language data translated in and transferred from the "multilingual translation network" into a multilingual processing database, and 5) a step of automatically changing the Web site.

Figure 6:
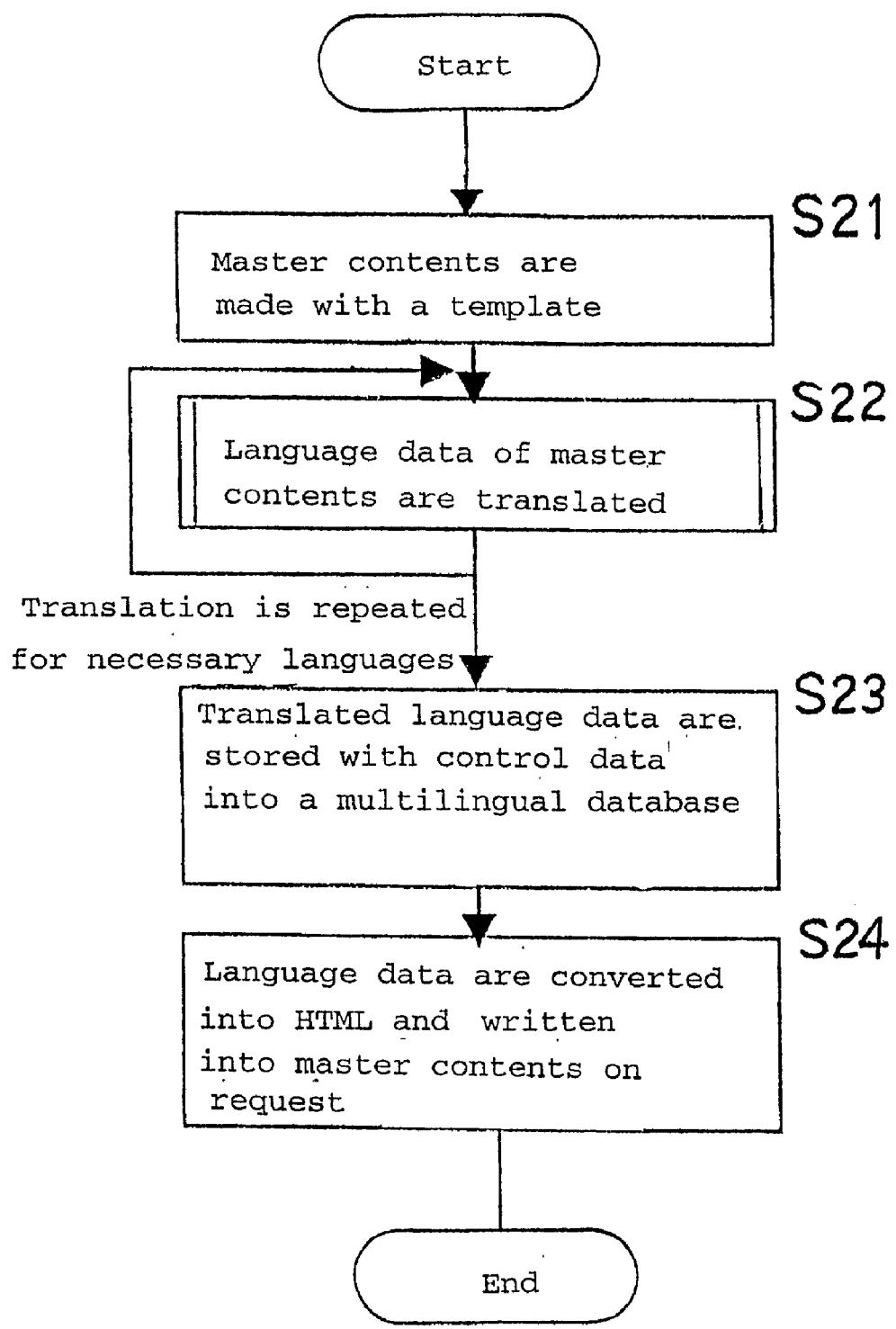
FIG. 6 is a flowchart showing a processing procedure of generating a multilingual translation by a functional composition of the present invention.
Figure 7:
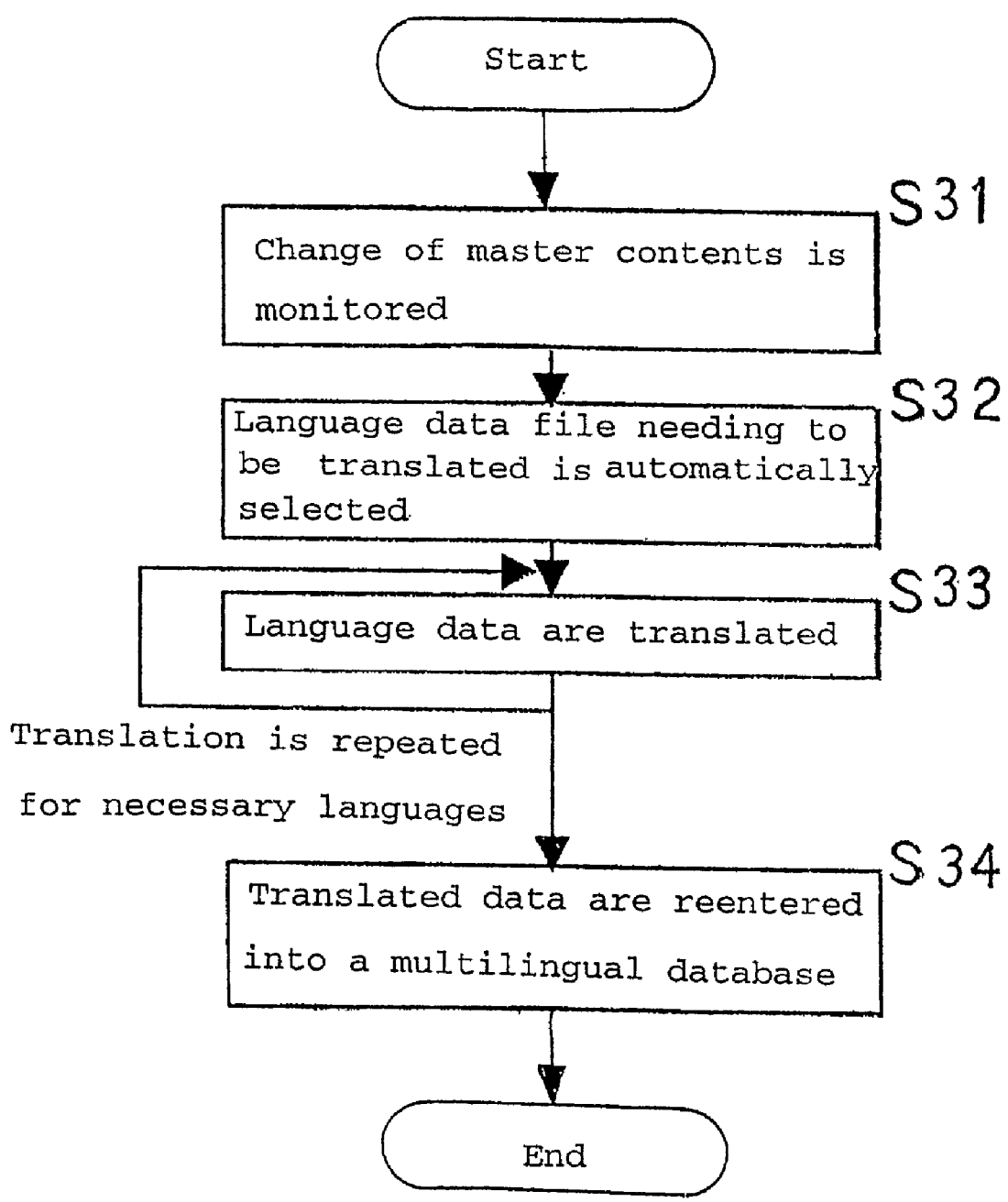
FIG. 7 is a flowchart showing a processing procedure of maintenance of a multilingual translation by a functional composition of the present invention.

FIG. 6 is a flowchart showing a procedure of performing a multilingual translation by means of a functional composition of FIG. 5, and FIG. 7 is a flowchart showing a procedure of performing maintenance of a multilingual translation by means of a functional composition of FIG. 5.

In FIG. 6, master contents are generated by means of a template (step S21). Next, language data in the master contents are translated (step S22). Routines for the processes in steps S21 and S22 are repeated for necessary languages. Next, the translated language data are stored together with control information into the multilingual processing database (step S23). Further, the language data are converted into HTML data and then are written into the master contents on request (step S24).

In FIG. 7, the change of the master contents is monitored (step S31). A language data file needing to be translated is automatically selected (step S32). The language data is translated (step S33). Routines for the processes in steps S31 to S33 are repeated for necessary languages. Next, the translated language data are reentered into the multilingual processing database (step S34).

Next, a main part of "performance of multilingual translation of the present invention" is described in detail.

Figures 8, 9:
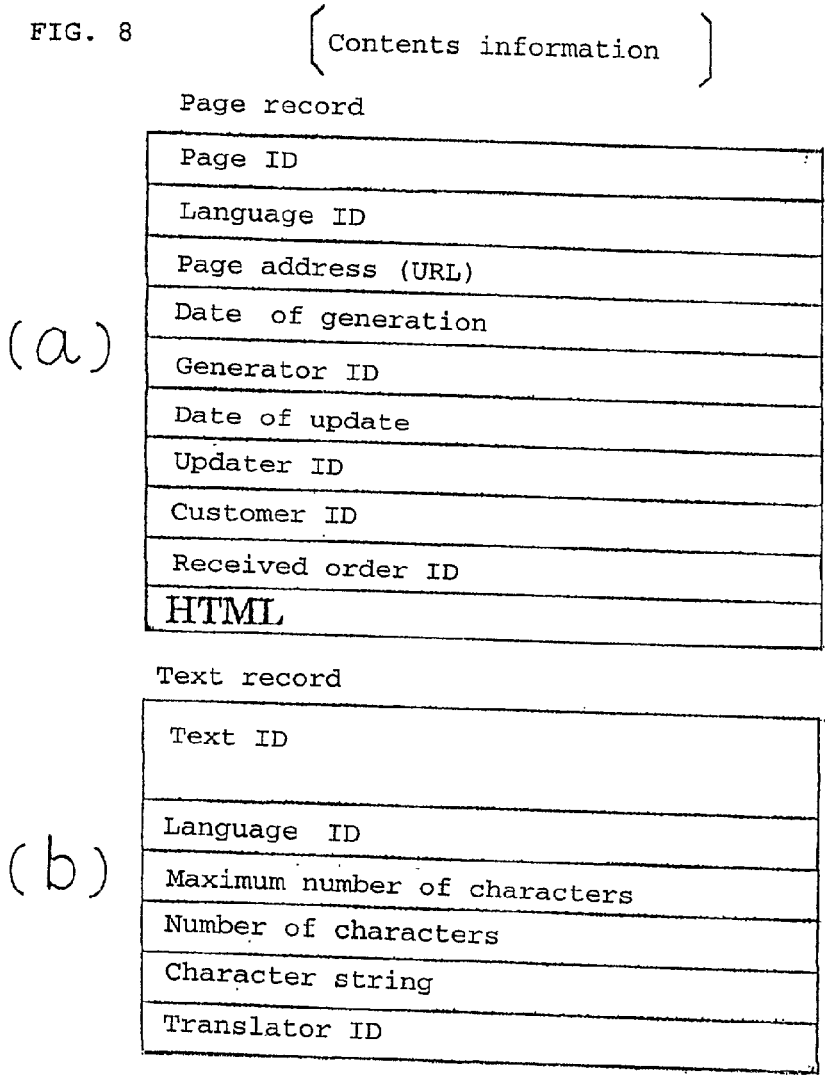
FIG. 8 is diagrams representing contents information in an embodiment, in which: (*a*) is a page record and (*b*) is a text record.
FIG. 9 is a figure for explaining the relation between a page record and a text record in the embodiment.

FIG. 8 shows contents information for managing a translation process (working).

FIG. 8(*a*) represents a page record and FIG. 8(*b*) represents a text record.

In FIG. 8(*a*), a page record of contents manages a translation process by means of the following identification code IDs and dates: a page ID: a symbol number being unique to each page, a language ID: a symbol number defined for each language, a page address: URL of the home page, a date of generation: a date at which the page was generated, a generator ID: a symbol number of a person who newly generated the page, a date of update: a date at which the page was updated last, an updater ID: a symbol number of a person who updated it last, a customer ID: a symbol number assigned to each customer, and a received order ID: a symbol number determined on reception of an order, and HTML: a page source text in the form of HTML.

In FIG. 8(*b*), a text record manages a work process by means of the following identification code IDs and character information: a text ID: a symbol number being unique to each text (the same ID in any language), a language ID: a symbol number defined for each language, the maximum number of characters: the maximum number of characters capable of being displayed, the number of characters: the number of characters actually displayed, and a translator ID: a symbol number determined for each translator.

For the relation between the page record and the text record shown in FIG. 8, a special tag (represented as MLWSTEXT in this case) for "performing multilingual translation of the present invention" on a text portion displayed in a page source of the HTML field in the page record by means of a special editor is automatically inserted. The text ID of a text record is specified in this special tag. And in case of "alt (alternative newsgroup hierarchy)" in an image tag, a special (MLWSTEXT) tag is directly embedded.

FIG. 9 is a figure for explaining the relation between the page record and text record, and FIG. 10 is a diagram for explaining concrete contents of this conversion.

In case of actually transferring a translation writing in another language according to access (request through reading the home page of a multilingual translation service) from a translation requester (translation requester apparatus 4), a text ID of a language having the same language ID as a language to be converted having a special (MLWSTEXT) tag and a special (MLWSTEXT) ID key is retrieved and replaced. Since the special tag has been erased at this time, a desired language page is only displayed at the translation requester side.

In other words, a fact that it has been converted into another language is not recognized by the translation requester (translation requester apparatus 4).

In FIG. 10, (*a*) is a text record showing a concrete example of Japanese (JP), and (*b*) shows a text record of a concrete example English (US) obtained by translation.

Next, a multilingual processing database is described.

Figure 11:
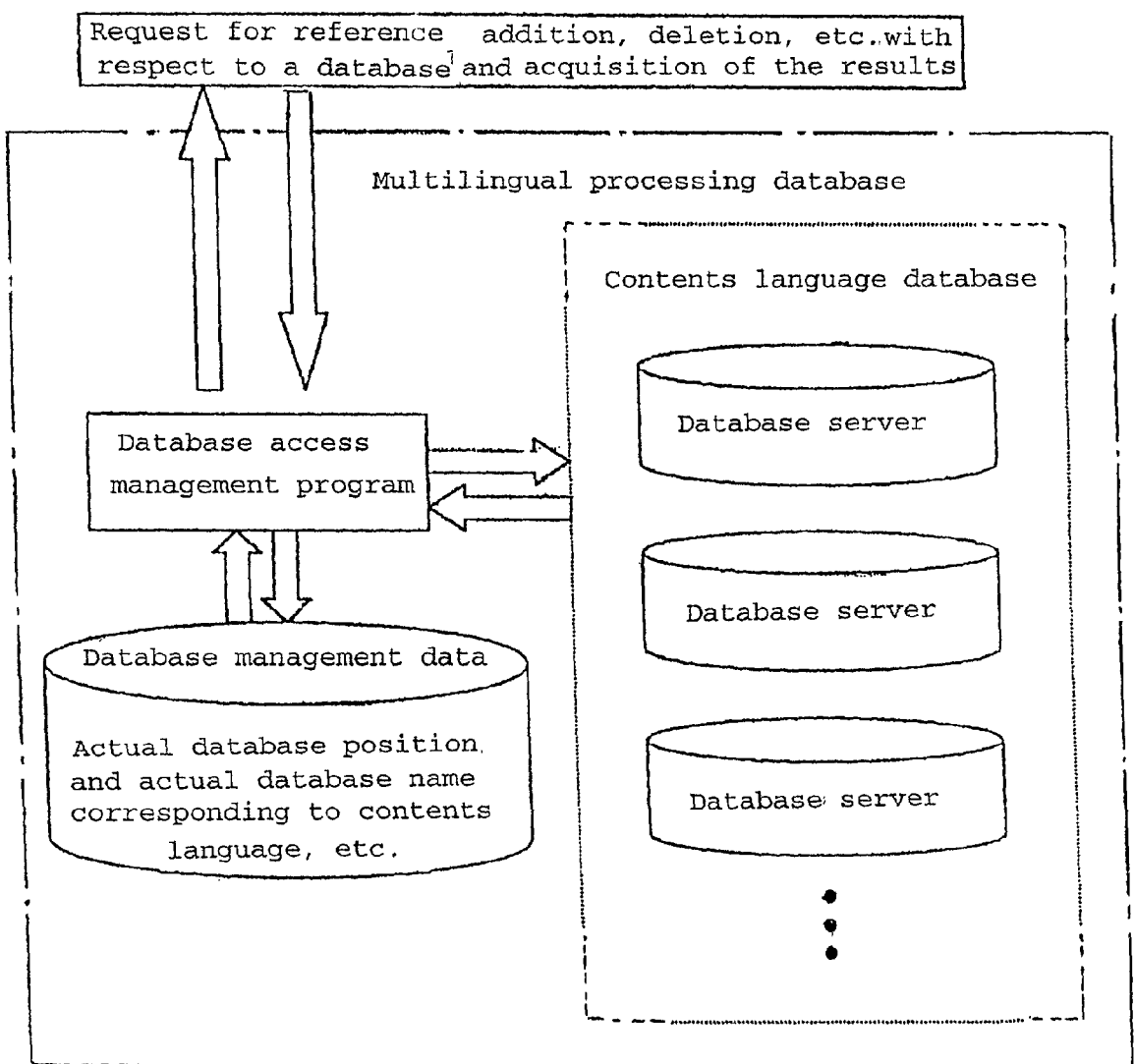
FIG. 11 is a block diagram for explaining a process in a multilingual processing database in the embodiment.

FIG. 11 is a block diagram for explaining a process in a multilingual processing database (multilingual processing database apparatus 17 in FIG. 2).

In FIG. 11, the multilingual processing database performs its data processing by executing an access management program. This data processing requests reference, addition, update, deletion and the like with respect to the multilingual processing database, and acquires their results by means of the access management program.

And database management data are exchanged by executing the database access management program. These database management data are an actual multilingual processing database position and an actual multilingual processing database name corresponding to a contents language and the like. And data are exchanged with a contents language database by executing the database access management program. This contents language database is composed of a plurality of database servers.

In such a way, the multilingual processing database is provided with a plurality of servers, which can be distributively disposed. The database acquires an actual server name, server position, multilingual processing database name and the like from database management data in response to a request for a language ID, page ID and the like, and accesses a multilingual processing database desired out of database servers.

Next, the change of a master Web site is described.

The change of a master Web site corresponds to "automatically selecting language data for translation excepting non-language data (graphics and photographs from master contents of a master Web site" explained with reference to FIGS. 4 and 5.

Figures 12, 13, 14:
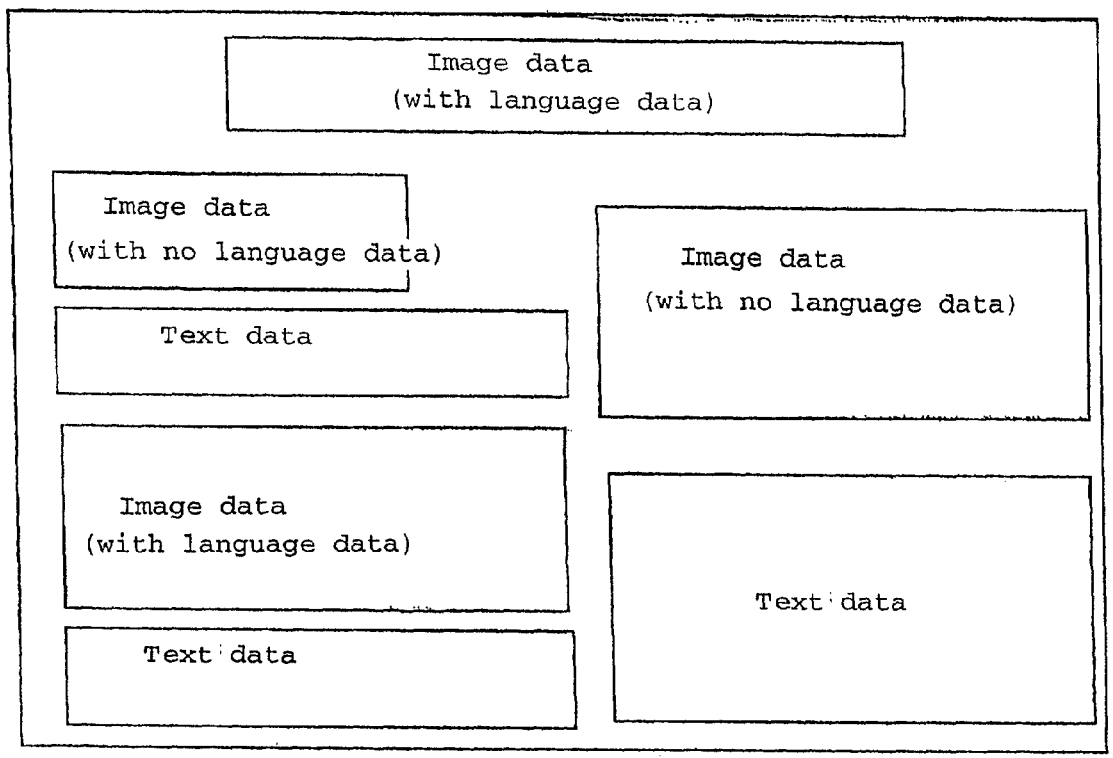
FIG. 12 is a diagram for explaining generation of master contents by means of a template in the embodiment.
FIG. 13 is a diagram showing ratios in font of other languages to Japanese in the embodiment.
FIG. 14 is a diagram showing change in number of characters after translation from Japanese into other languages.

FIG. 12 is a diagram for explaining generation of master contents by means of a template.

In FIG. 12, these templates includes templates used for automatically selecting image data (containing language data), image data (containing no language data) and text data, respectively. There are plural pieces of image data (containing language data), plural pieces of image data (containing no language data) and plural pieces of text data, said plural pieces of data being respectively different in data quantity from one another. Language data are automatically selected by means of such a template.

Further, with reference to FIG. 12, translation of language data in an image, the ratio of the smallest font capable of being displayed in a home page, and the change in number of characters after translation are described.

(a) In case of translating also language data in an image Such language data in an image are dealt with in the same way as "alt" (which is converted from a text form into a binary form). The process of modifying language data in an image is a human work. A process of replacement or the like is dealt with in the same way as text record data.

(b) Ratio of the smallest font capable of being substantially displayed (in a home page) according to languages The ratio of the smallest font is determined in advance in a table (a character font conversion circuit 15).

FIG. 13 is a diagram showing the ratios of other language fonts to Japanese.

FIG. 13 shows the ratios of English "0.8", German "0.8", . . . , Chinese "1.1" to Japanese "1". These correspond to the degrees of complexity of characters of the respective languages. The maximum number of characters of a text data record is associated with a language ID on the basis of these ratios.

(c) Change in number of characters from an original language before translation to a destination language after translation FIG. 14 is a diagram showing change in number of characters by translation from Japanese into other languages.

FIG. 14 derives the ratio of change depending on languages, for example, from experience of translation. The number of characters in a language after translation is obtained by means of a table having these ratios stored in it.

FIG. 14 shows respectively the ratios of English "1.3", German "1.3", . . . , Chinese "0.8" to Japanese "1". These correspond to differences in writing volume depending on characters written in the respective languages.

In master contents, a storage area is secured (set) according to the expected maximum number of characters, but when the following process is additionally performed, the maximum number of characters are securely dealt with.

First, it is judged whether or not the number of characters in a destination language after translation, said number being obtained by computation relative to the number of characters in an original language before translation, falls within the maximum number of characters. That is to say, in case that said number falls within the maximum number of characters, the translation is performed, and in case that said number does not fall within the maximum number of characters, the number of characters in the original language before translation is reduced as modifying the writing so that its meaning does not change.

This modification is a human work.

Next, a master Web site, generation of master Web contents and generation of multilingual contents are described.

Figure 15:
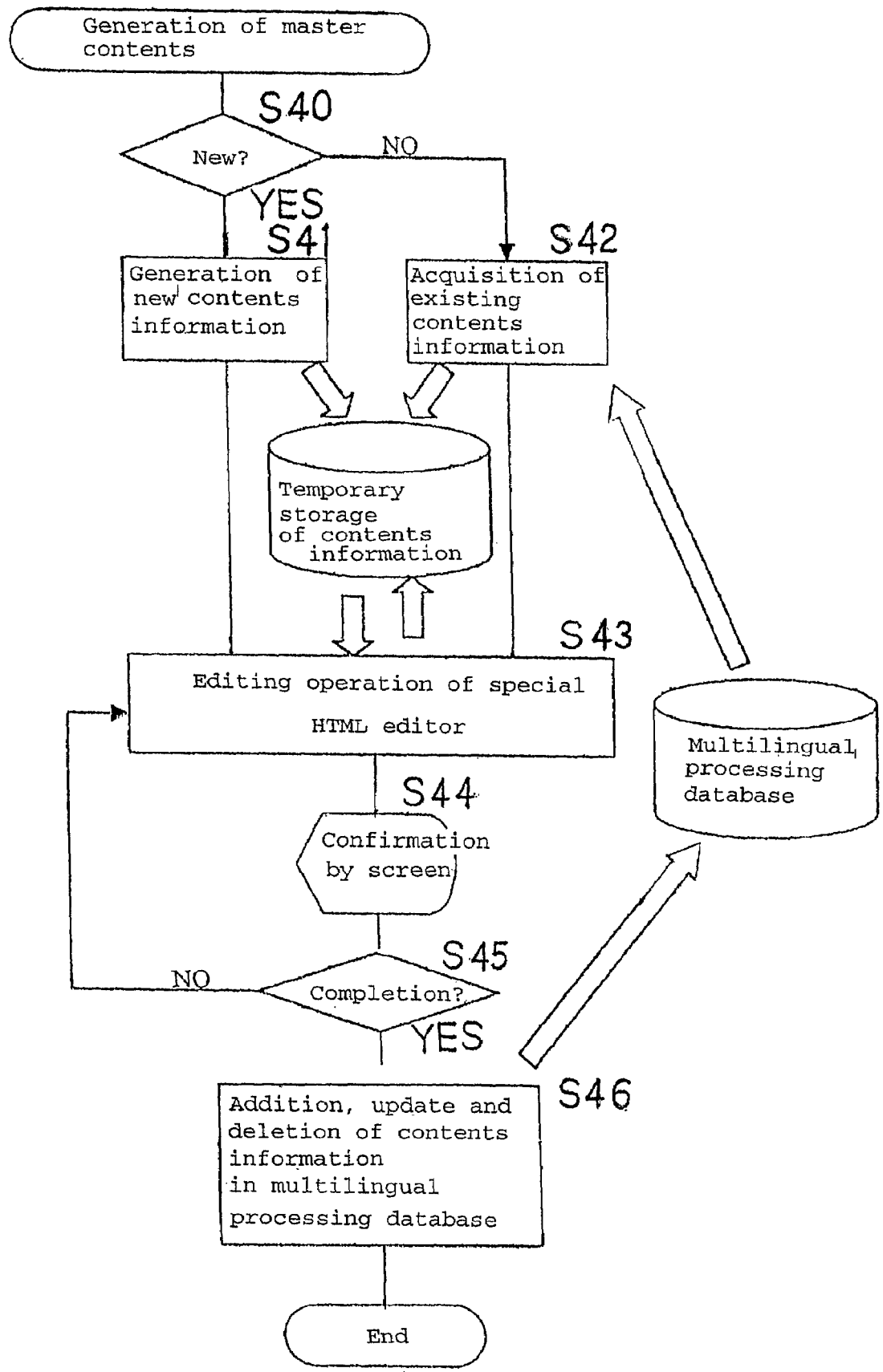
FIG. 15 is a flowchart showing a processing state of generation of master Web contents in a translation process in the embodiment.

FIG. 15 is a flowchart showing a processing state of generation of master Web contents in a translation process.

Referring to FIG. 15, generation of master Web contents is started and whether or not it is new is judged (step S40), and in case that it is new (S40: Yes), information of the new contents is generated and stored temporarily into the multilingual processing database (step S41). In case that it is not new (S40: No), the existing contents information is acquired and stored temporarily into the multilingual processing database (step S42).

After generation of new contents information or after acquisition of the existing contents information, a special HTML editor (editing) operation is performed (step S43). This special HTML editor operation exchanges and processes contents information with the multilingual processing database. Next, a screen confirmation is performed (step S44), and completion of generation of the master Web contents is judged (step S45).

In case of no completion (S45: No), routines on and after the special HTML editor of S43 are repeated. In case of completion in step S45 (Yes), addition, update and deletion of contents information in the multilingual processing database are performed and the process is ended (step S46).

Figure 16:
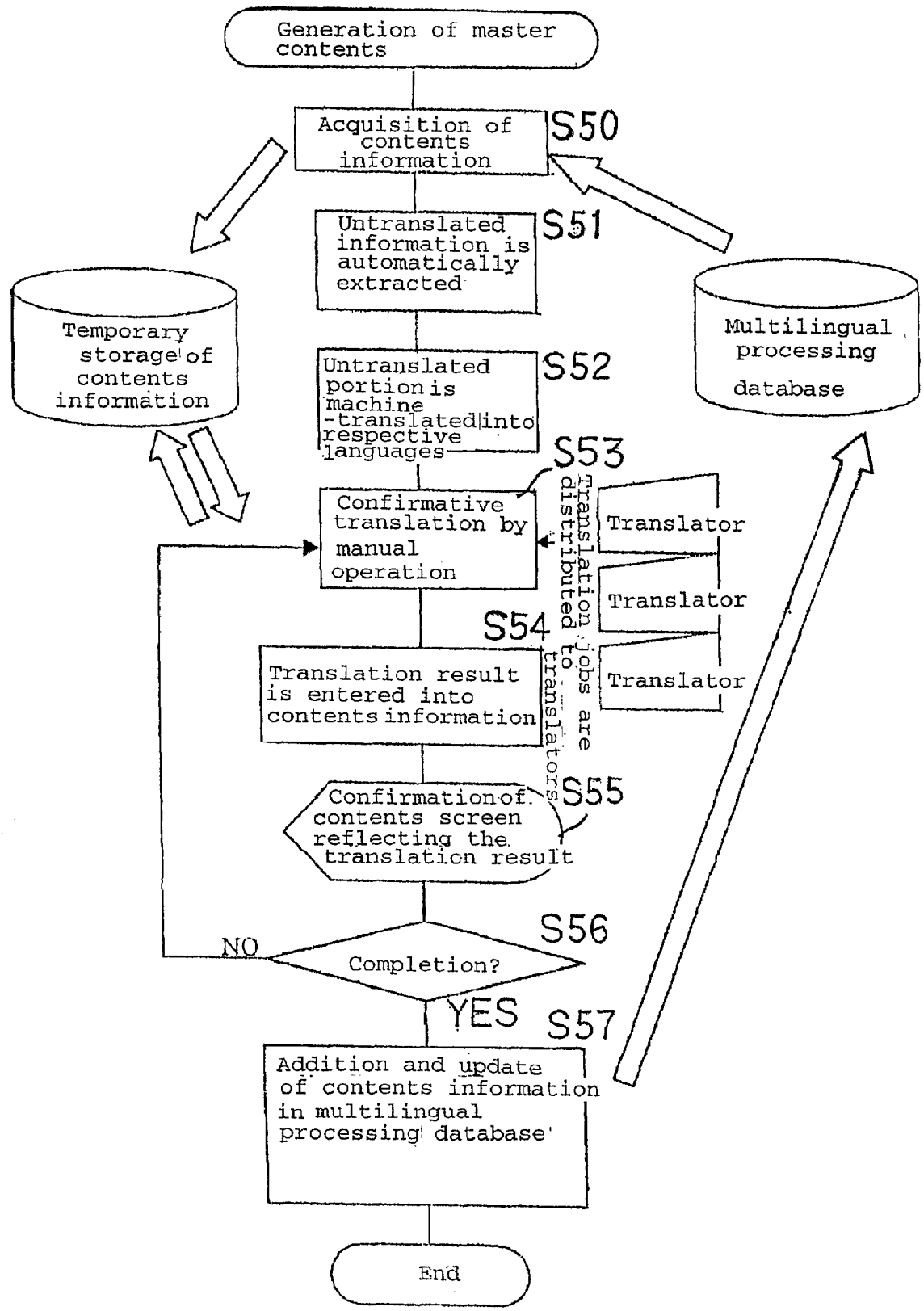
FIG. 16 is a flowchart showing a processing state of generation of multilingual contents in a translation process in the embodiment.

FIG. 16 is a flowchart showing a processing state of generation of multilingual contents in a translation process.

In FIG. 16, generation of multilingual contents is started, and contents information is acquired from the multilingual processing database and is stored temporarily in the multilingual processing database (step S50). Next, information of an untranslated portion is automatically extracted (step S51). Further, the untranslated portion is automatically machine-translated into the respective languages (step S52). Next, this automatic machine translation is confirmatively translated by a manual input operation.

This confirmative translation is performed through the above-mentioned "multilingual translation network" in which translators performing translation in many languages are organized on the Internet. That is to say, such a confirmative translation is performed through allocating each language translation to a translator capable of coping with it. Such a confirmative translation by a manual input operation is performed by exchanging contents information with the multilingual processing database temporarily storing the language data for translation in it (step S53).

Next, the resulting data of a confirmative translation by a manual input operation are inserted into contents information (step S54). The contents screen reflecting this translation result is confirmed (step S55). Further, completion of insertion of the contents information by the completed translation is judged (step S56). In case of no completion in this judgement (S56: No), the routines on and after the confirmative translation by a manual input operation of step S53 are repeated. In case of completion in step S56 (Yes), addition, update and deletion of contents information in the multilingual processing database are performed and the process is ended (step S57).

Next, another embodiment of the present invention being in combination with a mobile communication network is described. Although the above-mentioned embodiment has only a fixed communication network (digital wire communication circuit network 1, fixed general-purpose small computers and the like) arranged in it, but can be applied also to a mobile communication network as it is. For example, it can be applied to a case that a translation requester apparatus 4 side requesting a translation needs translation in various explanations at a place (a foreign company, for example) where it has come, performs a translation request from this place and instructs transfer of the translated writing to this foreign company.

A mobile communication network can be applied also to a multilingual translation Web site apparatus 2 and a translator apparatus 3 other than the translation requester apparatus 4 as it is.

Figure 17:
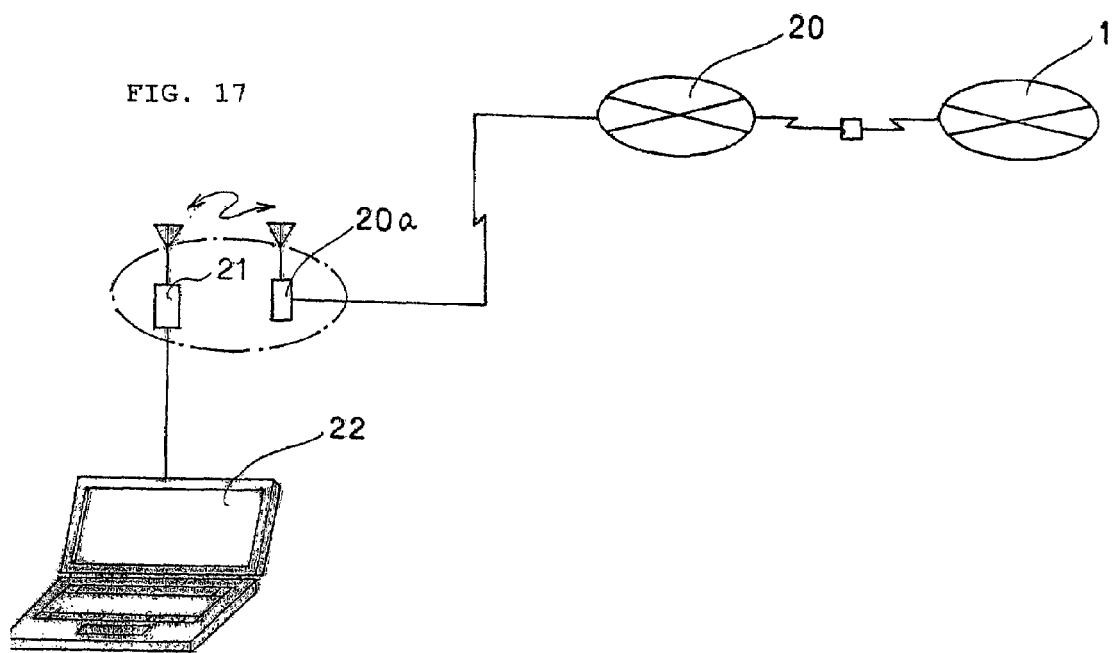
FIG. 17 shows a block diagram showing the configuration of a main part of a mobile communication network.
Figure 18:
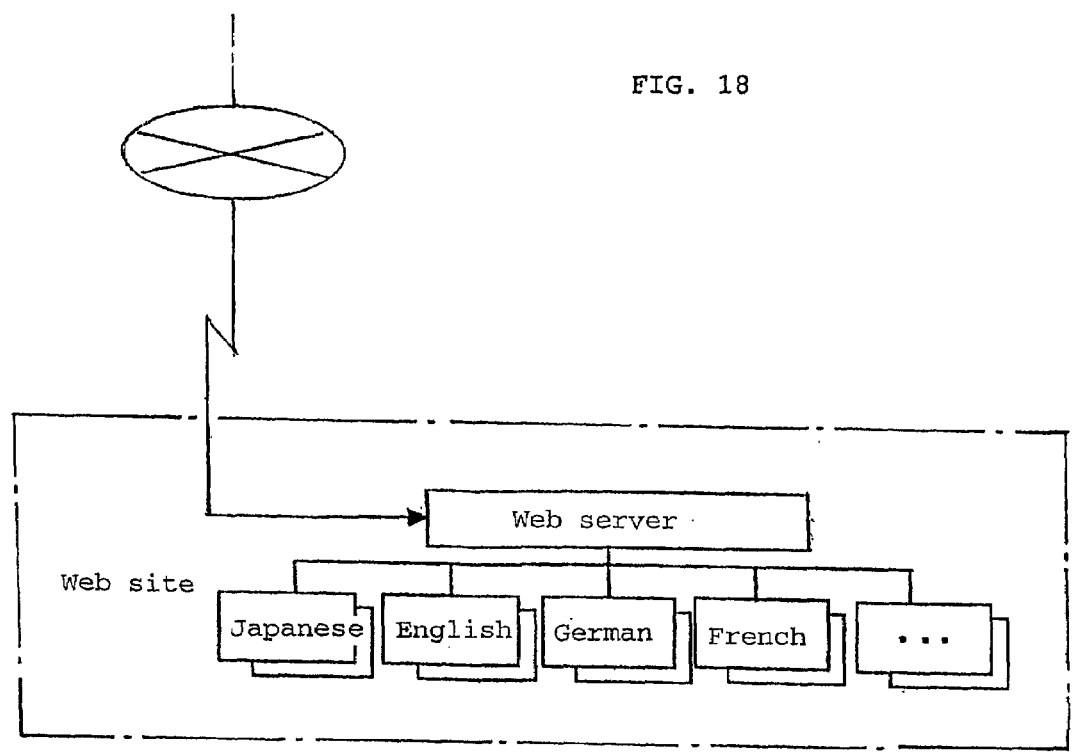
FIG. 18 is a block diagram for explaining the architecture of a conventional Web site for performing multilingual translation.
Figure 19:
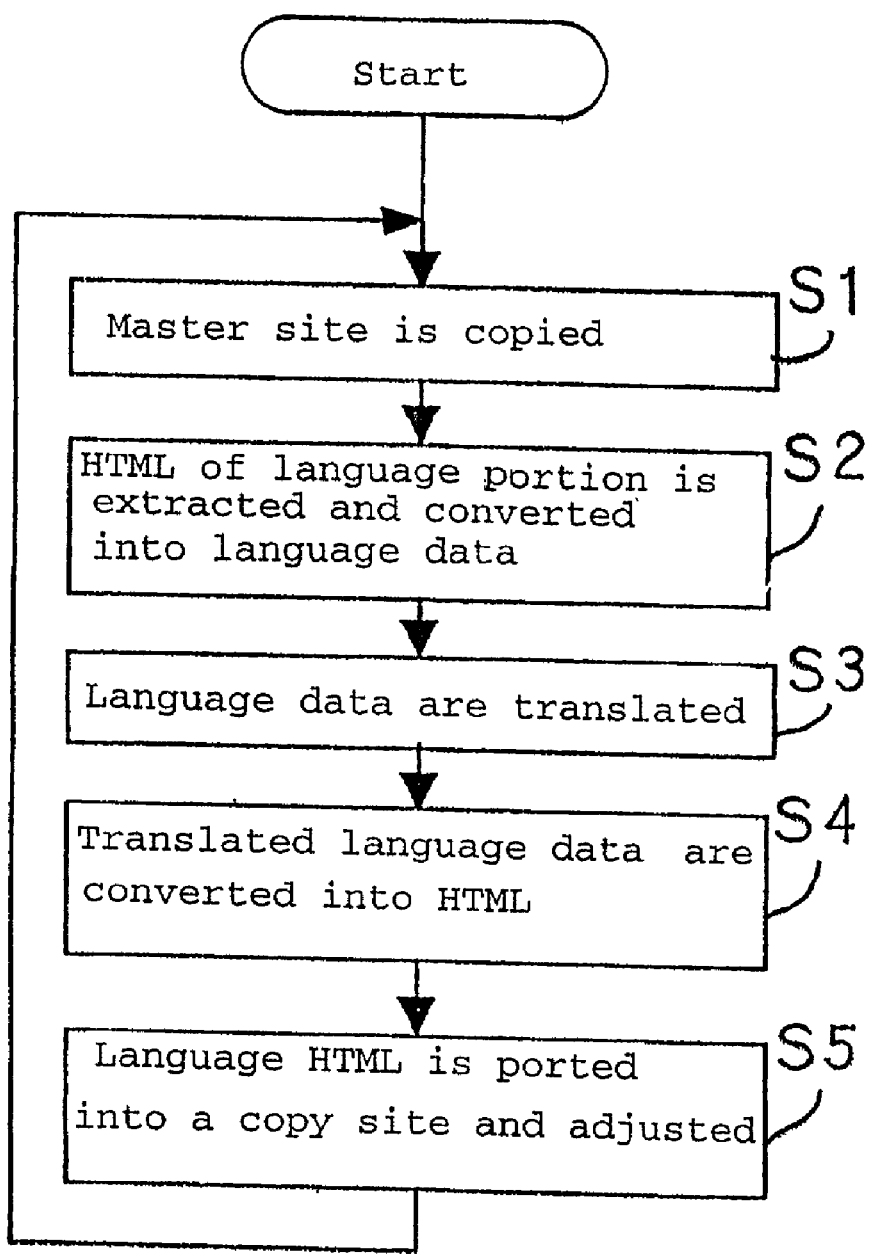
FIG. 19 is a flowchart showing a processing procedure of performing a multilingual translation in a conventional example.
Figure 20:
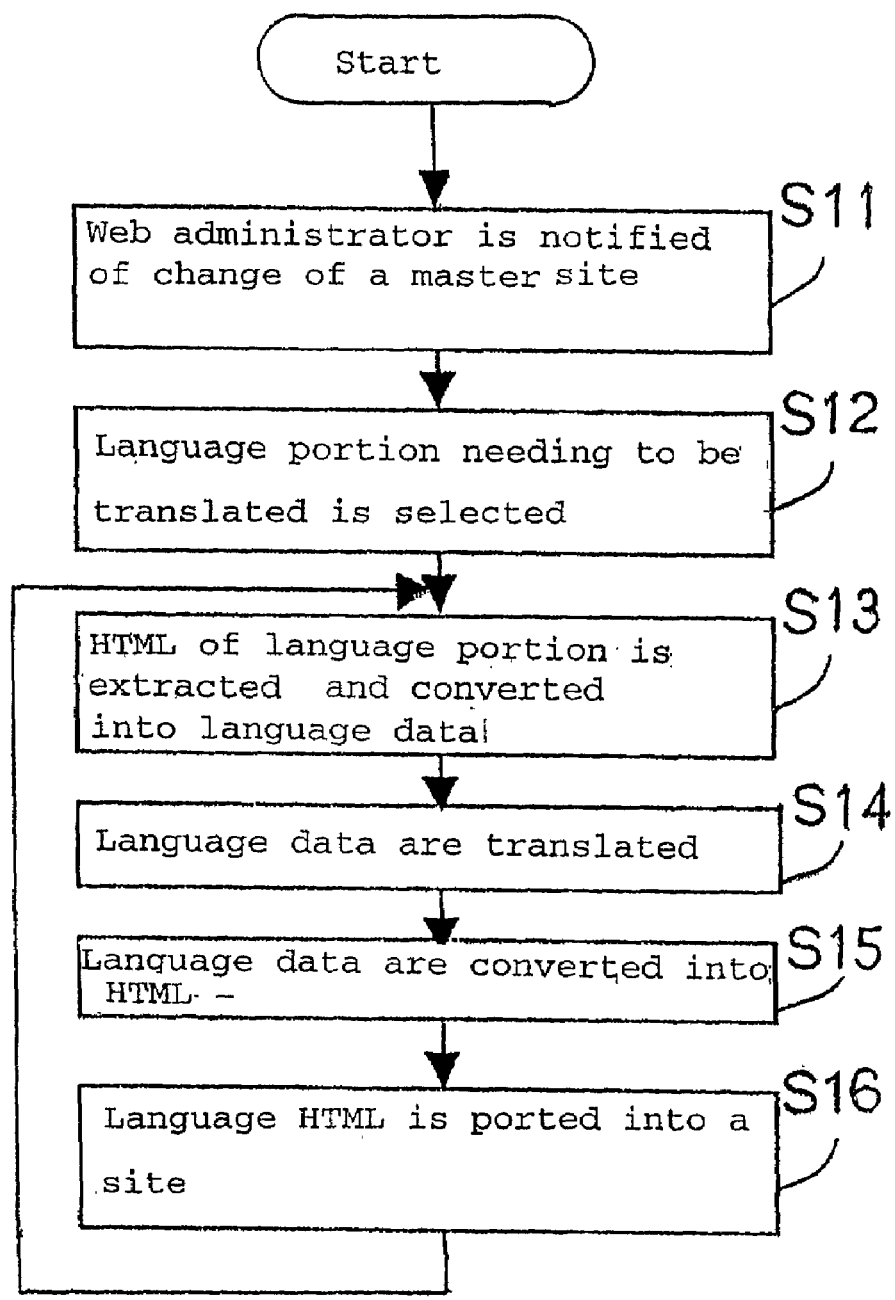
FIG. 20 is a flowchart showing a processing procedure of maintenance of a multilingual translation in a conventional example.

FIG. 17 shows an example of a block diagram of the configuration of a main part of a mobile communication network.

This example comprises a digital mobile communication circuit network 20 of a PDC (Personal Digital Cellar Telecommunication System) method, a PHS (Personal Handyphone System) method and the like connected by a connection device (gateway device or PHS connection device) for performing a communication protocol conversion and the like with the digital wire communication circuit network 1 shown in FIG. 1, and a mobile terminal 21 as a radio communication means to be connected with a cell base station 20a through a radio channel. The mobile terminal 21 has a mobile computer 22 connected to it.

This mobile terminal 21 is of an ordinary composition which comprises, for example, a transmitter/receiver part, modulator/demodulator part, time-division multiplexer part, Codec (coder/decoder) part, CPU, frequency change synthesizer, reception field strength (RSSI) detector part, external device connection interface part, incoming indicator light emitting diode, keypad, liquid crystal display device, incoming indication vibrator and the like. The mobile computer 22 is also of a similar composition to a general-purpose small computer of the translator apparatus 3 and the like in FIG. 1.

A method of transmission between the digital mobile communication circuit network 20 and a mobile terminal 21 may be any of a TDMA (PDC) method, TDMA/TDD (PHS) method and CDMA method (IS-95/IMT-2000), and its modulation method (PSK method or the like) is not limited in particular.

The digital mobile communication circuit network 20 and a mobile terminal 21 communicate with each other through a digital mobile communication circuit network 3 by means of a radio interval (air interface) of ARIB-27/28 standard (PDC method/PHS method), for example. It is preferable to apply the PHS method which can perform a broad-band transmission which is fast in data transfer rate in the present state and makes it easy to access the Internet by means of the PIAFS (PHS Internet Access Forum Standard) method to this communication.

These mobile terminal 21 and mobile computer 22 perform "performance of multilingual translation of the present invention" described above through the digital mobile communication circuit network 20.

In this embodiment, a variation example as described in the following is also possible.

The digital wire communication circuit network 1 may use an analog telephone network PSTN (Public Switched Telephone Network), and as a circuit connection device in this case, an NCU (Network Control Unit) and a modulator and demodulator (modem) may be used.

And the present invention can be also implemented by using a digital wire communication circuit network 1 in combination with a computer-to-computer communication using a communication protocol such as Z/YMODEM and the like in place of the TCP/IP transmission method.

And each apparatus of FIG. 1 may be formed into a duplex configuration composed of a current system and a spare system in consideration of improving its transmission reliability and preventing loss of stored data on the Internet.

Additionally, the present invention is implemented by utilizing the publicity (utilization by many unspecified persons) on the Internet, but can be applied also to a closed communication network being not opened to the public such as a company's Ethernet LAN, WAN (Wide Area Network) having FDDI-LAN, and the like as it is.

And these embodiments have been described under the assumption that a program is installed by means of an FD (floppy disk), CD-ROM or detachable memory, but such a program can be also installed by download through the Internet, for example.

The above application and variation examples can be easily carried out by persons in the same field, and the application and variation examples within the equal scope are all included in the present invention.

As apparently known from the above description, according to a method for performing multilingual translation by means of a communication network of the present invention, and a communication system and information recording medium for the same method, it has been made practicable to quickly and inexpensively provide a translation service in many languages without enlargement of its processing scale and apparatus scale by means of one Web site (a single Web site/firmware) consisting of one apparatus and one translation processing system on a communication network.

INDUSTRIAL APPLICABILITY

The present invention can be applied to a method for performing multilingual translation through a communication network, said method performing and providing a translation in many languages requested, by utilizing a communication network, and a communication network and information recording medium for the same method.

The invention claimed is:

1. A method for performing multilingual translation through a communication network, performing and providing a translation in many languages requested, said method comprising:
   a step of receiving language data of a subject of translation,
   a step of changing its processing form adaptively to a language of the subject of translation requested,
   a step of automatically selecting language data for translation,
   a step of performing translation,
   a step of entering the translated data into a multilingual processing database,
   a step of automatically changing the processing form of translation adaptively to a language after translation, and
   a step of enabling a requester side to receive the translated data,
   wherein said step of automatically selecting language data for translation generates language data, and image data being non language data, in master contents by means of a template, and
   wherein said language data contained in said image data is converted from a text form into a binary form for replacing the text-form data with the binary-form data.

2. A method for performing multilingual translation through a communication network according to claim 1, wherein said step of performing translation is at least one of an automatic machine translation and a manual input translation.

3. A method for performing multilingual translation through a communication network according to claim 1, wherein a page source language record and a text source language record as contents information for processing each page are given in said multilingual processing database.

4. A method for performing multilingual translation through a communication network according to claim 3, wherein said page source language record comprises:
   a page ID: a symbol number being unique to each page,
   a language ID: a symbol number defined for each language,
   a page address: URL of a home page,
   a date of generation: a date at which the page was generated,
   a generator ID: a symbol number of a person who newly generated the page,
   a date of update: a date at which the page was updated last,
   an updater ID: a symbol number of a person who updated the page last,
   a customer ID: a symbol number assigned to each customer,
   a received order ID: a symbol number determined on reception of an order, and
   HTML: a page source text in the form of HTML.

5. A method for performing multilingual translation through a communication network according to claim 3, wherein said text source language record comprises:
   a text ID: a symbol number which is unique to each text and is the same in any language,
   a language ID: a symbol number defined for each language,
   maximum number of characters: maximum number of characters capable of being displayed,
   number of characters: number of characters actually displayed,
   a character string: a character string in itself, and
   a translator ID: a symbol number determined for each translator.

6. A method for performing multilingual translation through a communication network according to claim 5, further comprising a step of obtaining the number of characters in a language after translation on the basis of a table storing in advance a ratio of change in number of characters in a language before translation and in a language after translation.

7. A method for performing multilingual translation through a communication network according to claim 5, further comprising steps of setting a storage area adaptively to said maximum number of characters, judging whether or not characters of a language after translation can be accommodated in the storage area of the maximum number of characters in comparison with the number of characters of the language before translation through computing the number of characters after translation and, in case that the maximum number of characters after translation can be accommodated in the storage area, performing the translation, and in case that the maximum number of characters cannot be accommodated in the storage area, reducing the number of characters of the language before translation so as not to change the meaning.

8. A method for performing multilingual translation through a communication network according to claim 3, further comprising steps of determining in advance a ratio of number of smallest legible font characters to number of characters being displayed on a screen for each language, and associating maximum number of characters of a text data record with a symbol number defined for each language by means of this ratio.

9. A method for performing multilingual translation through a communication network according to claim 1, wherein:
   said Web site comprising one apparatus and one translation processing system performs a multilingual translation process and its maintenance process and as said multilingual translation process, generates master contents by means of a template,
   next translates language data of the master contents,
   repeats these generation and translation processes,
   stores the language data together with control information into a multilingual processing database,
   further converts the language data into HTML data and writes them into the master contents on request, and
   as said maintenance process, monitors change of the master contents,
   automatically selects a language data file needing to be translated,
   translates the language data,
   repeats these monitor, automatic selection and translation processes for necessary languages, and
   reenters the translated language data into the multilingual processing database.

10. An information recording medium storing a program for enabling a substantial computer to control:

a process of receiving language data of a subject of translation through a communication network, a process of changing its processing form adaptively to a language of the subject of translation requested, a process of automatically selecting language data for translation, a process of performing a translation transferred through the communication network, a process of entering the translated data into a multilingual processing database, a process of automatically changing its translation processing form adaptively to the language after translation, and a process of enabling a requester side to receive the translated data through the communication network, said medium further storing a program for enabling a substantial computer to control at least one of:

a process of generating language data, and image data being non-language data, by means of a template, a process of converting language data contained in image data from a text form into a binary form and replacing the text-form data with the binary-form data, a process of giving a page record and a text record as contents information for processing each page in a multilingual processing database, and a process of judging whether or not characters to be obtained after translation can be accommodated in a storage area of the maximum number of characters through computing the number of characters after translation relative to the number of characters of a language before translation.

11. A multilingual translation system for receiving a translation request of a subject written in one language into other multiple languages and for providing translations of the subject via a communication network (1), comprising a translation requester apparatus (4) for transmitting the translation request via the communication network (1), a multilingual translation Web site apparatus (2) for receiving the translation request and intermediate for the translation, and a plurality of translator apparatuses (3) for translating the subject into the other languages, wherein the multilingual translation Web site apparatus (2) comprises:

means for converting the subject into an HTML data format ahd for storing the HTML data together with page source language records and text source language records assigned to the subject as master contents in a database (17);

means for extracting automatically plural parts of text to be translated and excepting non-language parts in the master contents of the subject stored in the database (17);

means for transmitting the plural parts of the text together with the page source language records and text source language records to a plurality of the translator apparatuses (3);

means for receiving translated text of the subject from a plurality of the translator apparatuses (3) and for assembling the translated text of the subject into translation results for each language and storing them as multilingual contents in the data base (17) according to the page source language records and text source language records assigned to the subject; and means for providing the multilingual contents to the translation requester apparatus (4), wherein the page source language record comprises at least:

a page ID: a unique code number to each page of the text, a language ID: a unique code number defined for each language, a page address: URL of a home page, a date of translation request: the date of the text generated, a translation requester ID: a unique code number assigned to each requester, a received order ID: a unique code number determined on reception of an order, and HTML data: a page source text in the HTML form.

12. A multilingual translation system according to claim 11, wherein the text source language record comprises at least:

a text ID: a unique code number assigned to each text, a language ID: a symbol number defined for each language, a maximum number of characters: the maximum number of characters capable of being displayed, a number of characters: number of actual characters, a string of characters: a character string in itself, and a translator ID: a unique code number assigned to each translator.

13. A multilingual translation system according to claim 12, wherein the means for extracting automatically plural parts of text includes template means for selecting image data containing language data, image data containing no language data, and text data, respectively.

14. A multilingual translation system according to claim 13, wherein the multilingual translation Web site apparatus (2) further includes means for machine-translating un-translated parts extracted from the multilingual contents stored in the data base (17).

15. A multilingual translation system according to claim 12, wherein the means for extracting automatically plural parts of text determines in advance a ratio of the number of smallest legible font characters to be displayed on a screen of the multilingual translation Web site, and associates a maximum number of characters of the text data in accordance with the ratio for each language.

16. A multilingual translation system according to claim 12, wherein the multilingual translation Web site apparatus (2) provides the multilingual contents to the translation requester apparatus (4) by means of an electronic mail or the Web site accessibly open to the translation requester apparatus (4) via the communication network (1).

17. A multilingual translation system according to claim 16, wherein the multilingual translation Web site apparatus (2) permits an access to the Web site from the translation requester apparatus (4) by checking an ID code and a password of the translation requester apparatus (4).

18. A multilingual translation system according to claim 11, wherein the multilingual translation Web site apparatus (2) further includes a net-bank apparatus (5) to perform a settlement of translation fees between the multilingual translation Web site apparatus (2) and the translation requester apparatus (4).

19. A multilingual translation system according to claim 11, wherein the communication network (1) is selected from the group consisting of a public wire communication network, a public radio communication network, a non-public wire communication network, and a non-public radio communication network under a TCP/IP environment.

* * * * *